Sept. 15, 1936. G. A. PATTERSON 2,054,711
VALVE CONSTRUCTION FOR RADIATORS
Original Filed March 2, 1935
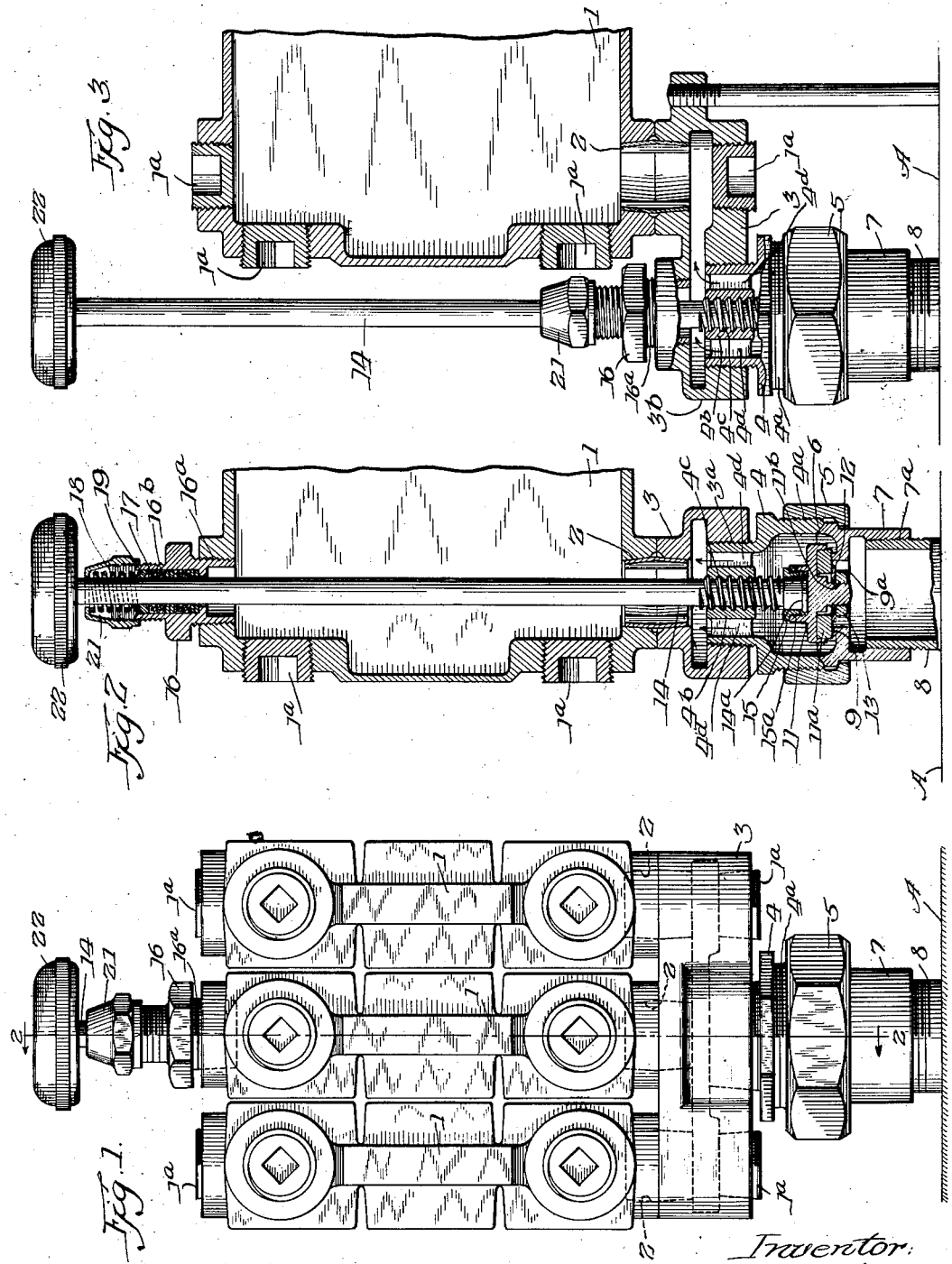

Patented Sept. 15, 1936

2,054,711

UNITED STATES PATENT OFFICE 2,054,711

VALVE CONSTRUCTION FOR RADIATORS

Glenn A. Patterson, Chicago, Ill., assignor to Crane Co., Chicago, Ill., a corporation of Illinois Application March 2, 1935, Serial No. 8,998
Renewed April 13, 1936

9 Claims. (Cl. 257—159)

This invention relates to a valve construction for radiators, and more particularly to that type designated by those skilled in the art as radiator valves.

It has been the increasing tendency to provide for a greater amount of usable floor space within homes and apartments as well as in industrial applications, and for this reason it has been the practice to install concealed or similarly unobtrusive radiation for purposes of supplying heat to such premises. Such applications in addition have necessitated more compact arrangements of radiation, since it is customary to install such radiation behind grilles, within radiator covers, or in cabinets, and the like.

Obviously, confining the radiation itself to restricted space has also introduced the problem of acquiring even more compact control means for such radiation. More specifically, the valves used likewise must be capable of being fitted into relatively small spaces and be operable conveniently from within the wall space or enclosure or exteriorly thereof as the occasion may warrant. Such radiation must be capable also of being installed relatively close to the floor surface in order to be able to obtain the highest efficiency therefrom in addition to the space considerations. Ordinarily, the space between the assembled radiation and the floor might be referred to as waste space. The installation of previous types of fluid control valves to such radiation has made it necessary for such waste space to be tolerated, because the valves themselves were necessarily bulky and not at all efficient in their contribution to the heating system.

In addition, in concealed radiation the radiators are frequently installed in banks or in series of two or more, and these banks of radiators are usually served by a common header which provides the connections for the banks as required.

A principal object of my invention therefore is to provide for a valve assembly which is relatively simple and inexpensive to manufacture and is adapted to adequately meet the demands as a radiator inlet control valve on such service as previously outlined.

Another important object is to provide an improved inlet control valve assembly, preferably for installation within the radiator itself, and which is also capable of being conveniently removed and readily renewed in the event that replacement or repairs are needed during the course of service without the necessity for incurring long and expensive shut-downs of the pipe lines in order to accomplish the same.

Another object is to provide a valve structure which is easily and quickly attached to such radiation, and in which the valve structure is so compact as to enable the entire assembly to be installed closer to the floor than is ordinarily possible.

Other important advantages will be apparent upon reference to the drawing, in which—

Fig. 1 is a side exterior view of one form of a radiator assembly embodying one form of invention installed upon concealed type of radiation.

Fig. 2 is a front fragmentary sectional view showing one form of my invention as embodied in a valve when installed upon concealed radiation.

Fig. 3 is a side fragmentary sectional view showing another form of my invention adapted to be installed upon radiation in which the valve structure is not entirely concealed within the radiator but permits of the stem operating member to be exteriorly positioned and manipulated.

In the various views similar numerals indicate like parts.

Referring to the drawing and describing my invention merely as illustrated and not in limitation thereof, referring to Fig. 2 specifically, numeral 1 refers to the section of the radiator having push nipple means 2 for connection to a header 3 having inlets to the radiators, which is preferably held to the casing 1 by means of tie rods (not shown).

For purpose of obtaining attachment to subsequent radiator sections as may be required, the countersunk plugs 1a are provided for selective replacement by pipe nipples and the like (not shown).

The valve of my invention is a unitary structure preferably attached to the said header by means of the threads 3a upon the male tailpiece 4 having threads 4a for attachment to a union ring 5 and forming thereby a joint as at 6, with the female tailpiece 7 having threaded connections 7a for attachment to tubing 8.

It is evident that by means of the union ring 5 threadedly cooperating with the tailpiece 4, a joint is obtained which is relatively easy to make and break as occasion requires, but at the same time, does not require the relatively large space ordinarily used by a valve casing. It is further apparent that the combination of the member 7 acting as the seat for the valve together with the tailpiece 4 joined by the union ring 5 avoids the use of a separate valve casing, and at the same time, provides the necessary connection between the heating system or piping and the radiator valve.

The female tailpiece 7 is provided with a seat portion 9 controlling the inlet 9a leading from a source of supply for the heating medium to which the pipe 8 connects. A valve disc holder 11 is preferably provided with a renewable composition or metallic disc 11a which is suitably attached to the said holder by means of the threaded extension 11b in cooperation with the flat washer 12 and the disc nut 13. The disc holder 11 is preferably attached to a reciprocably moving stem 14 by means of the threaded bushing 15 which is threadedly attached to the disc holder as at 15a, thus engaging the head or shoulder 14a of the stem 14. Preferably integral with the male tailpiece 4, a threaded spider 4b is provided with the stem threads 4c for engagement with the complementary threads of the stem 14. The valve stem is preferably of such length so as to extend the height of the radiator section as shown and with further provision at its upper portion as hereinafter described.

In one preferred adaptation, as shown in Fig. 2, at the upper end of the radiator section 1 a centerpiece 16 is preferably connected thereto by the threads 16a in axial alignment with the male tailpiece 4 at the lower portion of the casing 1. The centerpiece 16 is preferably provided with the conventional stuffing box 16b having packing 17 peripherally engaging the stem 14, the packing being compressed by means of the spring 18 so as to constantly and uniformly bear down upon the packing washer 19. The compression is obtained by the usual means of the threaded stuffing nut 21. Beyond the stuffing nut 21, an operating handwheel 22 is used to rotate the stem 14 upon its threads 14c for the control of the inlet 9a.

It is apparent that the radiator section 1 thus serves as a pressure containing casing for the valve trimming unit, the latter consisting generally of the respective tailpieces, union ring, closure member, stem, centerpiece, stuffing nut, packing and the handwheel. It is further apparent that the valve as such, occupies relatively little space above the floorline A, and at the same time, permits controlling means of prompt and convenient operation from above and also quick renewability in the event of the replacement of parts being required.

The radiator casing 1 for the purpose of attachment to parallel positioned subsequent casings, is provided with countersunk plugs 1a.

In Fig. 3 in the modification therein shown, the stem for a considerable portion of its length is preferably positioned exteriorly of the radiator section 1 by reason of employing a special header 3 which permits of the offset 3b. Thus, the centerpiece 16 is positioned directly upon the offset section 3b of the header rather than upon the top of the radiator section 1 as shown in Fig. 2. It is apparent that in other respects the construction is similar to that shown in Fig. 2.

Obviously, many adaptations of my valve structure are possible, and I desire therefore to be limited only by the scope of the claims appended hereto;

I claim:—

1. In combination with a radiator section, a valve assembly comprising a valve closure member, an operable connection therefor, a centerpiece connected to said radiator section, a tailpiece providing a valve seat for said closure member, the said radiator section being interposed between said centerpiece and the said tailpiece, means connecting said tailpiece to said radiator section, valve ports within said tailpiece, the said centerpiece being coaxial with said tailpiece, whereby actuation of the said operable connection exteriorly of said radiator section movement of the said closure member is produced within the said section.

2. In a radiator valve in assembled relation with a radiator section, comprising a valve closure member, an operable connection, an operating stem therefor, means for journalling said stem within said radiator section, a tailpiece providing a valve seat for said closure member and connecting the latter to the said radiator section, means connecting said tailpiece to said radiator section, valve inlet ports within said radiator section, the said journalling means being in axial alignment with said tailpiece.

3. In a radiator valve in assembled relation with a radiator section, comprising a valve closure member, an operable connection therefor, an operating stem, a header, a centerpiece journalled within said radiator section, a tailpiece providing a valve seat for said closure member, means connecting said tailpiece to said header, valve ports within the said radiator section and said header, the said centerpiece being in axial alignment with said tailpiece.

4. In combination with a heat exchanger section, a valve assembly therefor comprising a valve closure member, an operable connection therefor, an operating stem, journalling means upon said exchanger section for said stem, a tailpiece coaxial with said journalling means and providing a valve seat for the said closure member, a spider within said tailpiece and providing valve ports therebetween, stem actuating means upon said spider providing for reciprocating movement of the said stem, the said valve seat being adjacent to the said actuating means upon said spider, whereupon by actuation of the said operable connection exteriorly of the said section, reciprocating movement of the said closure member within said section is obtained.

5. In a radiator valve in assembled relation with a radiator section, comprising a valve closure member, an operable connection therefor, a centerpiece journalled within the upper portion of said radiator section, a header connected to said radiator section at the lower portion thereof, a tailpiece providing a valve seat for said closure member and attached to said header, means connecting said tailpiece to the said header, valve ports within the said radiator section and the said header, the said centerpiece being coaxial with said tailpiece, whereby control of the heating medium through said valve ports is obtained from above said radiator section.

6. In a radiator valve in combination with a radiator section, comprising a valve closure member, an operable connection therefor, an operating stem of greater length than the height of said section, a centerpiece journalled within said radiator section, a tailpiece providing a valve seat for said closure member, threaded means connecting said valve seat to said radiator section, the said centerpiece being in axial alignment with said tailpiece, the latter having means whereby reciprocating movement of said stem is accomplished.

7. In a radiator valve in assembled relation with a radiator section, comprising a valve closure member, an operable connection therefor, an operating stem, a header, a centerpiece journalled within said header, a tailpiece providing a valve seat for said closure member, stem operating means within said tailpiece adjacent to said journalling means, a union ring connecting said tailpiece to said header, valve ports within the said header, the said centerpiece being in axial alignment with said tailpiece.

8. In a radiator valve in assembled relation with a radiator section, comprising a valve closure member therefor, an operating stem, a centerpiece journalled within said radiator section, a tailpiece providing a valve seat for said closure member, means connecting said tailpiece to said radiator section, a valve inlet within the said radiator section, the said centerpiece and said tailpiece providing for journalling and actuating means at the respective ends of the said operating stem, the said centerpiece being coaxial with said tailpiece.

9. In a radiator valve in combination with a radiator section comprising a valve closure member, an operable connection therefor, an operating stem, a header, a centerpiece journalled within said radiator section, a tailpiece providing a valve seat for said closure member, the said centerpiece being coaxially superposed above said tailpiece, the said centerpiece and the said tailpiece being separably connected by the said header, threaded means connecting said tailpiece to said header, valve ports within the said radiator section and said header.

GLENN A. PATTERSON.